US010626283B2

(12) United States Patent
Mercado et al.

(10) Patent No.: US 10,626,283 B2
(45) Date of Patent: Apr. 21, 2020

(54) POLYMER BLENDS OF NITRILE RUBBER AND POLYCHLOROPRENE

(71) Applicant: Ansell Limited, Richmond, Victoria (AU)

(72) Inventors: Agustin Portillo Mercado, Ciudad Juarez (MX); Miguel Angel Sanchez Gonzalez, Ciudad Juarez (MX); Fernando Dominguez, Ciudad Juarez (MX); Marco Antonio Carrillo Urenda, Ciudad Juarez (MX)

(73) Assignee: Ansell Limited, Victoria (AU)

( * ) Notice: Subject to any disclaimer, the term of this patent is extended or adjusted under 35 U.S.C. 154(b) by 1111 days.

(21) Appl. No.: 14/542,700

(22) Filed: Nov. 17, 2014

(65) Prior Publication Data

US 2015/0135403 A1    May 21, 2015

Related U.S. Application Data

(60) Provisional application No. 61/906,212, filed on Nov. 19, 2013.

(51) Int. Cl.
*C09D 109/02* (2006.01)
*A41D 19/00* (2006.01)
*A41D 19/04* (2006.01)

(52) U.S. Cl.
CPC ......... *C09D 109/02* (2013.01); *A41D 19/001* (2013.01); *A41D 19/04* (2013.01)

(58) Field of Classification Search
CPC ...... C09D 109/02; B05D 3/007; B05D 7/548; A41D 19/001; A41D 19/04
See application file for complete search history.

(56) References Cited

U.S. PATENT DOCUMENTS

| | | | |
|---|---|---|---|
| 3,929,722 A | 12/1975 | S et al. | |
| 3,943,192 A | 3/1976 | Douglas | |
| 3,943,193 A | 3/1976 | Miyagawa et al. | |
| 4,116,743 A | 9/1978 | Davis | |
| 4,130,528 A | 12/1978 | Chen | |
| 5,187,232 A * | 2/1993 | Musch | C08L 11/00 525/191 |

(Continued)

FOREIGN PATENT DOCUMENTS

| | | |
|---|---|---|
| AU | 2014353859 A1 | 4/2016 |
| CN | 101407599 A | 4/2009 |

(Continued)

OTHER PUBLICATIONS

Database WPI, Week 201268 Thomson Scientific, London, GB; AN 2012-M46535, XP002770100.

(Continued)

*Primary Examiner* — Jeremy R Pierce
(74) *Attorney, Agent, or Firm* — Moser Taboada (57) ABSTRACT

Polymer compositions including blends of approximately 90 to approximately 60 percent by weight acrylonitrile butadiene copolymer and approximately 10 to approximately 40 percent by weight polychloroprene copolymer are disclosed. Methods for manufacturing unsupported gloves and for supported gloves including a knitted liner with the polymer compositions, producing gloves having an ANSI abrasion resistance level 4, are also disclosed.

20 Claims, 3 Drawing Sheets

(56) References Cited

U.S. PATENT DOCUMENTS

| | | | |
|---|---|---|---|
| 5,486,402 A | | 1/1996 | Flint et al. |
| 5,708,132 A | * | 1/1998 | Grimm .............. C08C 1/15 |
| | | | 526/339 |
| 5,912,288 A | | 6/1999 | Kazuo et al. |
| 5,962,579 A | * | 10/1999 | Schulz ............ C04B 41/4876 |
| | | | 524/522 |
| 6,000,061 A | | 12/1999 | Taneja et al. |
| 6,067,394 A | | 5/2000 | Ruello et al. |
| 6,114,469 A | * | 9/2000 | Rauchfuss ............ C08K 3/30 |
| | | | 524/492 |
| 6,279,616 B1 | | 8/2001 | Croft et al. |
| 6,566,435 B1 | * | 5/2003 | Teoh ................ C08L 13/02 |
| | | | 128/844 |
| 6,743,021 B2 | | 6/2004 | Prince et al. |
| 6,913,758 B2 | | 7/2005 | Hourihan et al. |
| 7,008,187 B2 | | 3/2006 | Cazzaniga |
| 7,182,391 B2 | | 2/2007 | Thrasher et al. |
| 7,988,983 B2 | | 8/2011 | Yu et al. |
| 8,268,353 B2 | | 9/2012 | Merovitz |
| 8,322,916 B2 | | 12/2012 | Patt |
| 2008/0190322 A1 | | 8/2008 | Chen et al. |
| 2009/0038053 A1 | | 2/2009 | Merovitz |
| 2010/0138978 A1 | | 6/2010 | Ikeda et al. |
| 2010/0325777 A1 | * | 12/2010 | Radhakrishnan ......................... A41D 19/01558 |
| | | | 2/161.1 |

FOREIGN PATENT DOCUMENTS

| | | |
|---|---|---|
| CN | 101948576 A | 1/2011 |
| CN | 101948576 A | 1/2011 |
| CN | 102604259 A | 7/2012 |
| EP | 0423593 A1 | 10/1990 |
| EP | 0423593 A1 | 4/1991 |
| EP | 0451998 A2 | 10/1991 |
| EP | 2181826 A1 | 5/2010 |
| EP | 2181826 A1 | 5/2010 |
| WO | WO1993008983 A1 | 5/1993 |
| WO | WO 99/24507 | 5/1999 |
| WO | WO-9924507 A1 | 5/1999 |
| WO | WO2000029478 A1 | 5/2000 |
| WO | WO 01/90236 A1 | 11/2001 |
| WO | WO-0190236 A1 | 11/2001 |
| WO | WO2001090236 A1 | 11/2001 |
| WO | WO-2004/044037 A1 | 5/2004 |
| WO | WO 2012/085587 A1 | 6/2012 |
| WO | WO-2012085587 A1 | 6/2012 |
| WO | WO2012085587 A1 | 6/2012 |
| WO | WO 2015/006807 A1 | 1/2015 |

OTHER PUBLICATIONS

Supplementary European Search Report dated Jun. 30, 2017 for Application No. 14863776.2.

Chinese Office Action dated Dec. 4, 2017 for Application No. 201480061322.5.

Chinese Office Action dated Apr. 24, 2017 for Application No. 201480061322.5.

Internataional Search Report and Written Opinion dated Feb. 11, 2015 for PCT Application No. PCT/AU2014/001043.

Extended European Search Report dated Oct. 6, 2017 for Application No. 14863776.2.

Essawy, The Use of Montmorillonite as a Reinforcing and Compatibilizing Filler for NBR/SBR Rubber Blend, Polymer Testing, Oct. 2004, vol. 23, Issue , pp. 803-807.

Rahiman et al., Cure Characteristics and Mechanical Properties of Styrene-Butadiene Rubber/Acrylonitrile Butadiene Rubber, Materials Letters, Science Direct, Mar. 2005, vol. 59, Issue 6, pp. 633-639.

Sadhu et al, Preparation and Properties of Nanocomposites Based on Acrylonitrile-Butadiene Rubber, Styrene-Butadiene Rubber, and Polybutadiene Rubber, Mar. 15, 2004 Wiley Online Library URL: http://onlinelibrary.wiley.com/doi/10.1002/polb.20036/abstract?deniedAccessCustomisedMessage=&userIsAuthenticated=false.

Alex et al., Studies on Natural Rubber/Acrylonitrile Butadiene Rubber/Organoclay Nanocomposites, Maney Publishing's online platform, Jun. 1, 2006, pp. 219-225, vol. 35, Issue 5.

Botros et al., Homogeneous Styrene Butadiene/Acrylonitrile Butadiene Rubber Blends, Taylor Francis Online, 2006, vol. 45, Issue 4.

Non-Sterile Chemical Resistant Gloves, BioClean Solac, URL: http://www.nitritex.com/downloads/BPT4.pdf.

Compatibilisation of SBR/NBR Blends with Dichlorocarbene Modified Styrene Butadiene Rubber, Chapter 6, URL: http://shodhganga.inflibnet.ac.in/bitstream/10603/6194/12/12_chapter%206.pdf.

Moonprasith et al. , Blending in Latex Form of Natural Rubber and Nitrile Latices: A Preliminary Study of Morphology and Mechanical Properties, National Metal and Materials Technology Center, Thailand, pp. 1-3.

Duraprene™ CP Sterile Synthetic Gloves, VWR, Cardinal Health, URL; https://ca.vwr.com/store/catalog/product.jsp?product_id=4549373.

Unvulcanised Rubber Coated Diaphragm Fabric, Vikashmi Fabric Pvt. Ltd., URL: http://in104706850.trustpass.alibaba.com/product/123987079-103364143/UNVULCANISED_RUBBER_COATED_DIAPHRAGM_FABRIC.html.

Swastika Constant Care, NBR-PVC Blend Rubber Polymers, URL: http://www.indiamart.com/swastikaconstant/nbr-pvc-blend-rubber.html.

Third party observations from the European Patent Office for patent application No. 14863776.2 dated Sep. 12, 2018.

* cited by examiner

POLYMER BLENDS OF NITRILE RUBBER AND POLYCHLOROPRENE

CROSS-REFERENCE TO RELATED APPLICATIONS

This application claims the benefit of U.S. Provisional Application No. 61/906,212 under 35 USC 119(e), filed Nov. 19, 2013, and is incorporated by reference in its entirety.

BACKGROUND

Field of the Invention

Embodiments of the present invention generally relate to polymeric compositions and, more particularly, to blends of acrylonitrile butadiene copolymers and polychloroprene copolymer polymeric compositions that are capable of being disposed as coatings on fabric liners creating supported gloves or as unsupported or unlined gloves.

Description of the Related Art

Gloves are utilized in many fields of service for protecting workers, such as for medical, industrial, household, and other applications. In service, gloves are subjected to extensive wear from cuts, punctures, and abrasions, creating a need for durability. Furthermore, other in-service requirements include enhanced grip-ability, stretch-ability, and flexibility. Some gloves include a fabric liner that is dipped into a polymeric composition to form a coating that covers at least a portion of the liner, i.e., a supported glove. The liners comprise yarns for various applications and polymeric coatings generally provide chemical-resistance, abrasion resistance, and the like.

Polymeric compositions generally include various materials such as polyvinyl chloride, natural rubber latex, nitrile rubber, styrene-butadiene, polyurethane, polychloroprene, and the like. Also, polymeric compositions optionally contain additives, such as pH balancers, vulcanizing agents, and other additives, and the like to stabilize the polymeric compositions, or impart desired properties. However, typical blends of polymeric compositions utilize many fillers and processing aids in to balance physical and chemical properties, which is not an optimal solution. For example, polychloroprene materials are typically used in gloves for good chemical resistance and flexibility but do not perform particularly well physically. Nitrile rubber materials tend to have good abrasion resistance, though it has some undesired properties for a glove coating, such as inflexibility, and a "plastic" feel.

Therefore, polymeric or elastomeric compositions for coatings exhibiting enhanced flexibility and abrasion resistance and methods for manufacturing gloves incorporating the coatings would represent an advance in the art.

SUMMARY

Polymer compositions including a blend of approximately 90 to approximately 60 percent by weight acrylonitrile butadiene copolymer and approximately 10 to approximately 40 percent by weight polychloroprene copolymer, wherein the polymer composition is substantially free of anti-flocculants substantially described in detailed description and, as set forth more completely in the claims, are disclosed. Methods of manufacturing unsupported gloves and gloves having a liner coated with polymeric compositions, in accordance with the present invention, substantially described in detailed description and, as set forth more completely in the claims, are also disclosed. Various advantages, aspects, and novel features of the disclosure, as well as details of exemplary embodiments thereof, will be more fully understood from the following description.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention include polymeric compositions comprising blends ranging from approximately 90 to approximately 60 percent by weight acrylonitrile butadiene copolymer, and from approximately 10 to approximately 40 percent by weight polychloroprene copolymer. Embodiments of the invention also provide polymer blends comprising from approximately 60 to approximately 80 percent by weight acrylonitrile butadiene (NBR) copolymer and from approximately 20 to approximately 40 percent by weight polychloroprene. In some embodiments of the invention, the acrylonitrile butadiene is a carboxylated acrylonitrile butadiene, and the polychloroprene is a copolymer of chloroprene and sulfur. At least one exemplary embodiment of the invention comprises a polymeric blend comprising 70% acrylonitrile butadiene copolymer and 30% polychloroprene copolymer At least one embodiment according to the invention comprises a highly carboxylated acrylonitrile butadiene copolymer. One exemplary embodiment of the invention comprises a highly carboxylated acrylonitrile butadiene copolymer having approximately 35-40% acrylonitrile content, which exhibits enhanced grip performance in oily conditions as well as enhanced abrasion-resistance and heat aged-resistance.

A synergistic effect in blending carboxylated butadiene acrylonitrile copolymer compositions with polychloroprene copolymer compositions has been discovered, which provides a composition having an enhanced abrasion resistance and other mechanical properties while remaining flexible when disposed as a coating on a glove liner, such as a knitted liner, or as an unsupported glove. The composition blends also offer enhanced oil and water impermeability.

Without intending to be bound theory, it is believed that blends of NBR copolymers and polychloroprene copolymers, according to embodiments of the invention, require little to no anti-flocculant additives as is needed in previous rubber compositions and/or rubber composition blends, i.e., the blends are substantially-free of anti-flocculants. For example, rubber compositions, and especially blends of two or more elastomeric or polymeric materials, employ one or more anti-flocculants, such as polyphosphates, sulfonic acids, acetylenic diols, and anionic polymers, to neutralize positives charges on the elastomeric molecules so that the elastomeric molecules do not agglomerate. Anti-flocculants promote the suspension of the elastomeric or polymeric molecules in solution during compounding and polymerization. However, anti-flocculants prevent reactions from going to completion, thereby limiting molecular weight, resulting in relatively decreased physical properties, such as abrasion-resistance.

Furthermore, anti-flocculants prevent and/or interfere with cross-linking between elastomeric molecules. Moreover, blends of polymers are difficult to polymerize because of differences in reaction kinetics, which is complicated further by anti-flocculants as is known to those of skill in the art. In general, a composition of polychloroprene is pH adjusted to an intermediate pH of approximately 9.0 to 9.2 during compounding of the composition. Absent a pH adjustment, the polychloroprene molecules agglomerate.

In contrast, compositions according to the present invention require little to no anti-flocculants, i.e., is substantially-free of flocculants, and require lesser amounts of other fillers, such as thickeners, vulcanizing, curing, and cross-linking agents, and catalysts. It is believed that because the pH of the elastomeric components, which is approximately 8.0 to 9.0 for the NBR component and 12.0 to 13.0 for the polychloroprene, can be adjusted with the addition of a small amount (e.g., 0.1-1.0 PHR) of potassium hydroxide and the reaction kinetics can be controlled without including anti-flocculants in the composition, which would typically range from >1-10 PHR, while maintaining little to no agglomeration in blends. In this context, substantially free of anti-flocculants indicates, for at least one embodiment of the invention, that the amount of flocculants present, if any, would not be sufficient to prevent agglomeration of the elastomeric or polymeric molecules.

Moreover, because of the lack of flocculation and in view of a lesser amount of fillers, it is believed, without being limited by theory, the catalyst providing a mechanism for cross-linking, such as curing packages, e.g., sulfur (such as MB-2 E.S.) and activators and/or accelerators, such as zinc diethyldithiocarbamate (ZDEC), zinc dibutyldithiocarbamate (ZDBC), zinc oxide and/or the like, can more effectively crosslink (without, for example, the effects of steric hindrance of the anti-flocculants, surfactants, and other fillers) the NBR copolymer molecules with the polychloroprene copolymer molecules, creating a polymer having a higher molecular weight, higher crosslink density, and a subsequently higher abrasion level, i.e., an ANSI abrasion level index of 4. The "$S^{2+}$" sulfur crosslinks affect the physical properties of rubber compositions, i.e., produce longer crosslinks, improve tensile strength, tear strength and fatigue properties. Therefore, the accelerator based on a dithiocarbamyl group, such as ZDEC or zinc dibutyldithiocarbamate (ZDBC) promote faster curing and produce more and shorter crosslinks per mole concentration than, for example, methyl zimate.

Embodiments of the present invention include an unsupported glove as is known to those in the art or, alternatively, a supported glove that includes a fabric liner, such as a knitted or woven liner, having a polymeric, elastomeric, or latex composition (as described herein) disposed thereon to form a coated layer adhered thereto. In some embodiments, a second polymeric, elastomeric, or latex composition is disposed as a coating onto the coated layer, creating a glove having enhanced durability and grip-ability. According to various embodiments, the liner is a part of apparel, including but not limited to gloves, for example, forearm and knee compression sleeves, knee and elbow braces, and the like. According to embodiments of the invention, methods for manufacturing the glove include knitting a liner, dipping the knitted liner into a polymeric, elastomeric, or latex composition, for example, a polymeric composition discussed herein, to dispose a polymeric or elastomeric coating or layer on at least a portion of the liner, and curing the coating, producing a comfortable, flexible glove having enhanced abrasion-resistance.

Embodiments of the present invention include an aqueous coating composition comprising at least two aqueous elastomeric components, for example, a first elastomeric component having approximately 60 to 80 percent by weight acrylonitrile butadiene copolymer (NBR), and a second elastomeric component having approximately 20 to 40 percent by weight polychloroprene copolymer. The aqueous acrylonitrile-butadiene component has, in some embodiments, between 35-50% solids content. Similarly, the aqueous polychloroprene component has, in some embodiments, between 40-55% solids content. Compositions may be used for dipping and coating a knitted liner to obtain coated gloves or coating a former to form an unsupported glove. In some embodiments, the knitted liner is dipped into the aqueous coating to cover a portion of the knitted liner, such as a palm dip or three-quarters dip. In some embodiments, the entire knitted liner is dipped, e.g., a "full" dip. Also, any knitted liner may be used and, in some embodiments, the knitted liner is a HYFLEX® liner such as model 11-500, 80-813, or 97-100 liners marketed by Ansell Ltd. The 97-100 knitted liner comprises a para-aramid fiber, such as KEVLAR®, an elastomeric fiber, such as LYCRA®, and a nylon fiber in a yarn, which may be plaited therewith.

Three exemplary embodiments of blended compositions according to the invention are described in Tables 1-4. It is to be understood that the compositions need not contain each ingredient. For example, waxes, pigments, and the like may be omitted from any composition. According to various embodiments, gloves manufactured are suitable for varied uses, such as for oil field service workers, laborers, electricians, plumbers, masons, household uses, and the like, for which flexibility and abrasion-resistance are particularly desirable.

TABLE 1

Oilfield Service glove

| Actual Solid (%) | Ingredient | PHR | Supplier |
|---|---|---|---|
| 44.5 | Synthomer 6311 (NBR) | 70 | Synthomer |
| 4 | KOH (Caustic Potash) | 1 | Mardupol |
| 52 | DuPont Neoprene 571A Liquid Dispersion | 30 | Dupont |
| 50 | Curing package | 0.5 | — |
| 50 | Boxtex 378 (Sulfur 50%) | 1 | Akron Dispersions |
| 55 | Activators | 2.7 | — |
| 51 | Flint Group Xtreme Diansidine Orange | 1.5 | Flint Group Pigments |
| 33 | Wax | 1 | — |
| 6.5 | Acrysol RM 5000 Rheology Modifier (50%)/MHPC 50 (50%) | 0.4 | Rohm&Haas (RM5000)/(MHPC50) |
| | Total | 108.1 | |

TABLE 2

| Actual Solid (%) | Ingredient | PHR | Supplier |
|---|---|---|---|
| 44.5 | Synthomer 6311 (NBR) | 70 | Synthomer |
| 4 | KOH (Caustic Potash) | 1 | Mardupol |
| 52.52 | DuPont Neoprene 571A Dispersion | 30 | Dupont |
| 50 | MB-2 E.S. | 3 | Akron Dispersions |
| 55 | Zinc Oxide M-100 | 2.7 | Akron Dispersions |
| 34 | Ajack Black 7905 | 0.05 | Solution Dispersion |
| 55 | Red hydratint 187C | 0.5 | DVM Pigments |
| 6 | Acrysol G111 (90%)/RM 5000 (10%) | 0.4 | Rohm&Haas (G111)/(RM 5000) |
|  | Total | 106.9 |  |

TABLE 3

| Actual Solid (%) | Ingredient | PHR | Supplier |
|---|---|---|---|
| 45.5 | Synthomer 6311 | 70 | Synthomer |
| 4 | KOH | 1 | Mardupol |
| 52 | Neoprene 571A dispersion | 30 | Dupont |
| 15 | Darvan Waq | 0.2 | R.T. Vanderbilt |
| 50 | ZDBC | 0.5 | Akron Dispersions |
| 50 | Sulfur | 0.5 | Akron Dispersions |
| 55 | Zinc Oxide | 2.7 | Akron Dispersions |
| 51 | Xtreme orange pigment | 1.5 | Flint Group |
| 33 | Michemlube 135 | 1 | Michelman, Inc. |
| 6.5 | Acrysol G111(6%)MHPC-50 Rheology 50%-50% BASE 1 | 0.4 | Rohm&Haas Co. |
|  | Total | 107.8 |  |

TABLE 4

| Actual Solid (%) | Ingredient | PHR | Supplier |
|---|---|---|---|
| 44.5 | Synthomer 6810 | 80 | Synthomer |
| 4 | KOH | 0.5 | Mardupol |
| 52.52 | Neoprene 571A dispersion | 20 | Dupont |
| 50 | ZDBC | 1.0 | Akron Dispersions |
| 50 | Sulfur | 1.0 | Akron Dispersions |
| 50 | Zinc Oxide | 2.0 | Akron Dispersions |
| 70 | TiO2 | 1.0 | — |
| 46.97 | Blue pigment | 0.24 | — |
| 34 | Ajack Black 7905 | 0.15 | — |
| 55 | Red Hydratint 187C | 2.6 |  |
| 4 | Rohagit | 0.14 | — |
|  | Total | 108.99 |  |

DuPont® Neoprene™ liquid dispersions are aqueous anionic colloidal dispersions of chloroprene homopolymers or copolymers. The dispersions combine several characteristics including film formation, high cohesive strength without curing, elastomeric properties over a wide temperature range, and resistance to the degrading effects of weather, ozone, heat, water, and several oils and chemicals. Neoprene™ liquid dispersions contain varying levels of a microscopic gel (a polymer insoluble in tetrahydrofuran) that impart different properties. Neoprene™ 571 contains a high modulus copolymer of chloroprene, which is copolymerized with sulfur. Cured films based on Neoprene™ 571 have high strength in addition to good oil resistance. Optionally, other polychloroprene grades may be used. For example, Neoprene™ copolymer grades 671A, 750, 842A, and the like, offer varying additive packages for desired applications. Similarly, other grades of acrylonitrile-butadiene resins may be used, such as Synthomer™ 6320, 6501, 6710, and the like. Various waxes may be used in compositions according to the invention, such as carnauba wax or, for example, Michem Lube 135, manufactured by Michelman, Inc.

Table 5 shows the physical properties of gloves made in accordance with embodiments of the invention (model 97-100) and a comparison with gloves made of 100% nitrile (11-500) or 100% Neoprene™ (80-813), which is a 13 g, KEVLAR® liner having a core glass fiber and a foamed Neoprene™ coating. All are supported gloves having a polymeric coating (nitrile, Neoprene™, or a blend of both) disposed on a fabric liner, such as a HYFLEX® liner produced by Ansell Ltd. A Taber Abrasion Test, ASTM D 3389, using a 1000 g loading, was conducted for several gloves of each model. The number of revolutions is reported as the result, which is when the liner can be seen following the removal of the coating. As shown, an average value of 3024 revolutions was reported for the 11-500 nitrile glove and an average value of 2612 revolutions for the polychloroprene (Neoprene™) glove.

In stark contrast, it was surprisingly found that the 70%-30% blend of nitrile/polychloroprene resulted in a synergistic effect. Specifically, an average number of 4400 revolutions, i.e., ANSI level 4, resulted before the coating was abraded, representing an improvement ranging between 45-68% in abrasion cycles over the nitrile gloves and the polychloroprene gloves.

The blend of 70%-30% blend of nitrile/polychloroprene clearly presents a surprisingly substantial improvement in abrasion resistance over the non-blend samples. Other blends of nitrile/polychloroprene have shown similar results. Also, the Washed Level of 0 indicates that the coating and liner have bonded together well, i.e., do not delaminate. All gloves described herein achieved a Washed Level of 0.

TABLE 5

Comparison of abrasion results

| SAMPLE | THICKNESS (mils) | WEIGHT PCS (g) | TABER REVS |
|---|---|---|---|
| 11-500 | 0.043 | 25.64 | 4000 |
| 100% NITRILE | 0.056 | 25.64 | 2120 |
|  | 0.049 | 26.0 | 4000 |
|  | 0.05 | 28.0 | 2500 |
|  | 0.044 | 28.2 | 2500 |
| AVERAGE | 0.044 | 26.91 | 3024 |
| 80-813 | 0.050 | 40.89 | 2500 |
| 100% NEOPRENE ™ | 0.047 | 41.6 | 3000 |
|  | 0.053 | 38.3 | 2360 |
|  | 0.052 | 38.4 | 2200 |
|  | 0.050 | 40.6 | 3000 |
| AVERAGE | 0.050 | 40.77 | 2612 |
| 97-100 | 0.057 | 40.18 | 5000 |
| 70% NITRILE 30% NEOPRENE ™ | 0.062 | 41.39 | 4000 |
|  | 0.059 | 40.50 | 5000 |
|  | 0.06 | 40.18 | 3000 |
|  | 0.057 | 39.23 | 5000 |
| AVERAGE | 0.057 | 39.71 | 4400 |

The manufacturing process for forming a flexible polymer coated glove involves several steps. Embodiments according to the invention comprise disposing a polymeric composition, as described above in Tables 1-4, on a former, which may be optionally coated with a coagulant (such as a powdered coagulant or a coagulant in an aqueous, alcoholic, or aqueous-alcoholic solution) before the disposition step, to produce an unsupported glove. Alternately, a fabric liner can be dressed on a former and dipped into a polymeric composition, as described below.

In embodiments according to the invention, a knitted liner, comprising, for example, 70-221 denier yarn is knitted using, for example, at least one 18 gauge needle and is then dressed on a hand shaped ceramic or metallic former. The liner is optionally immersed in a coagulant, such as a 1-20 wt % aqueous salt solution. More specifically, the coagulant comprises a 2-15 wt % aqueous salt solution. According to embodiments of the present invention, the coagulant solution includes an aqueous solution of a divalent cationic metal salt and a salt stable polymer. In some embodiments, the salt is calcium nitrate having between approximately 7-50% by weight of the total coagulant content. In other embodiments, the calcium nitrate content is in a range of approximately 30-45% of the total coagulant content. The coagulant generally comprises an aqueous-based calcium nitrate having a solids content of approximately 60-70% by weight. Other suitable divalent cationic metal salts, for example, include calcium chloride, zinc nitrate, zinc chloride, magnesium acetate, magnesium nitrate, aluminum nitrate, and aluminum sulfate, which may be used individually or in combination with the calcium nitrate. At least one exemplary coagulant is a solution comprising 0.1% sodium diamyl sulfosuccinate, such as AY65 as marketed by Cytec Corp., 7% calcium nitrate, and 92.9% water. The at least one exemplary coagulant further comprises methanol and/or ethanol. Also, at least one exemplary coagulant solution comprises 3% acetic acid, 7% calcium nitrate, and 90% water.

The coagulant solution, whether the knitted liner is sprayed or dipped, penetrates the knitted liner. Subsequently, the liner is dipped into a polymeric composition, as described in Tables 1-4. The polymeric composition destabilizes and gels upon contact with the coagulant. The polymeric composition, such as the blend of Neoprene copolymer and carboxylated acrylonitrile butadiene copolymer described above, has a viscosity in the range of approximately 200-5000 centipoise, which may be controlled with the addition of thixotropic agents, such as thickeners, such as acrylic thickeners, such as Rohagit-branded products. For example, Rohagit SD 15 is a thickening agent based on an aqueous solution of methacrylic acid and acrylic ester copolymer, having the capability to acceptably modify the rheological properties of compound. Also, clays, such as Bentonite® or other aluminosilicates may be used. Embodiments of the invention include wherein the thickener is a solution of cellulose and polyacrylate. At least one exemplary embodiment according to the invention comprises a polymeric composition wherein the rheology modifier comprises at least one of a non-ionic urethane rheology modifier or an anionic acrylic emulsion or combinations thereof.

The polymeric composition optionally contains commonly used stabilizers including but not limited to potassium hydroxide, ammonia, sulfonates, and others known to those of ordinary skill in the art. The polymeric composition may contain other commonly used ingredients such as surfactants, anti-microbial agents, fillers/additives for imparting various physical and chemical properties, and the like, known to those of ordinary skill in the art.

Embodiments according to the invention produce a thin polymeric layer on a thin knitted liner. The liner having the polymeric layer disposed thereon is optionally washed to remove ungelled polymeric composition particles, as well as to remove coagulant salts and other processing chemicals used to stabilize and control viscosity and wetting characteristics of the polymeric composition, and is subsequently heated to vulcanize the polymeric composition. Although an 18 gauge liner was described above, The method can also be used to produce, for example, 7, 10, 13, 15, and other gauge knitted liners, which may be used for yarns of denier from 221 to 600 or higher. The higher the gauge number of the needle, the smaller a diameter of yarn is used, producing a thinner and more flexible glove.

Embodiments according to the invention further comprise wherein the polymeric composition is foamed. The air content of a foamed polymeric composition is in the 5 to 50% range on a volume basis. The polymeric composition may contain additional surfactants such as TWEEN 20 to stabilize the foamed polymeric composition, although this component is optional. Once the polymeric composition is foamed with the desired air content and the viscosity is adjusted, refinement of the foam is undertaken by using a whipping impeller stirrer driven at an appropriate speed. Air bubble size may be refined using a different impeller operated at a reduced speed. This foamed polymeric composition generally has a higher viscosity and therefore is does not penetrate the interstices between the yarns in the knitted liner, requiring a higher depth of immersion of the former having a knitted liner dressed thereon.

The air cells reduce the modulus of elasticity of the polymeric latex coating increasing the flexibility of the glove. An air content in the range of 5-15 volumetric percentile results in foams that have closed cells and the polymeric layer is liquid impervious, and also provides a coating having a spongy soft feel. Some of the air cells adjacent to the external surface open out providing increased roughness and have the ability to remove boundary layer of oil and water from a gripping surface, providing increased grip.

A foamed polymeric composition disposed on a liner having a volumetric air content in the range of 15-50% produces air cells adjacent to each other. During a vulcanization heating step, the air cells expand, contact each other, creating an open celled foam. Whether closed-cell or open-cell, foamed layers of polymeric composition produce yet even more flexible gloves.

Figure 1:
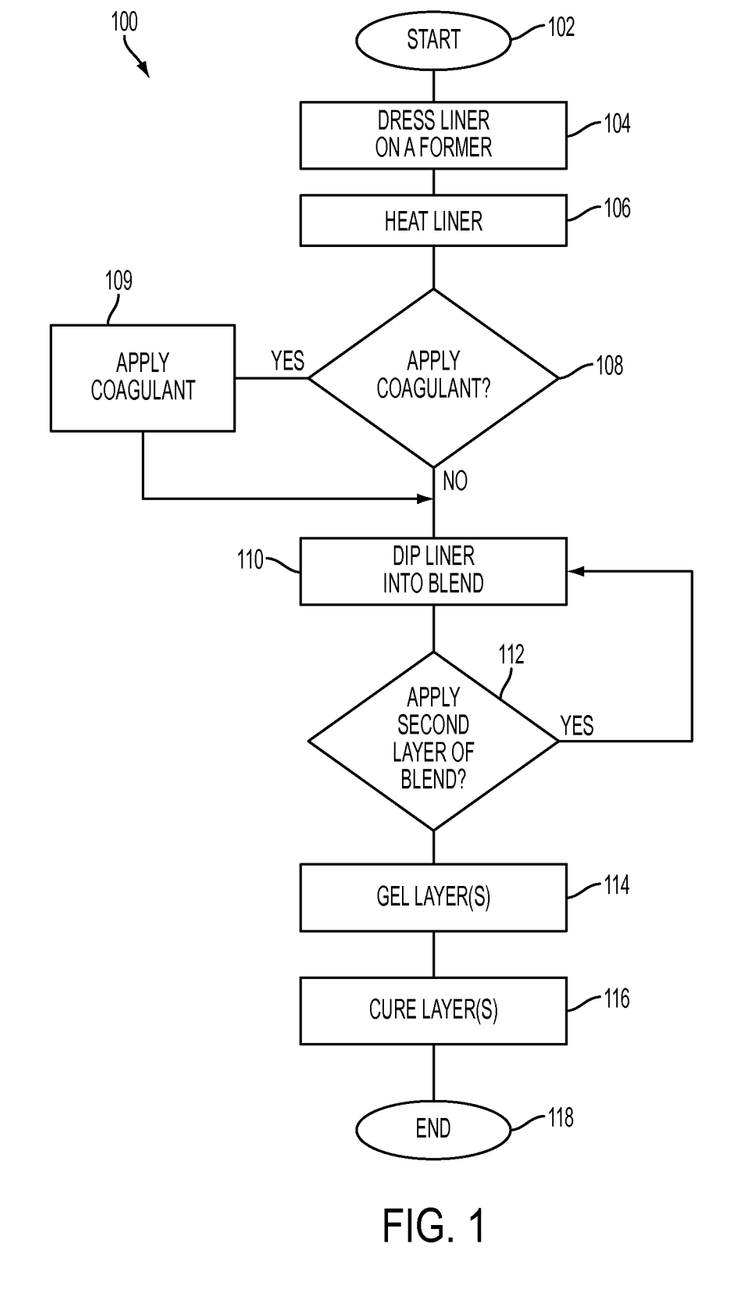
FIG. 1 depicts an exemplary flow diagram of a method for making a supported glove according to embodiments of the present invention.

FIG. 1 depicts an exemplary flow diagram of a method 100 for making a supported glove according to embodiments of the present invention. In at least one exemplary embodiment, a method 100 starts at step 102 and proceeds to step 104. At step 104, a fabric liner is provided as described above, and dressed on a former, the liner may comprise a knitted or woven structure. At step 106, the liner is heated, for example, in an oven. At step 108, the liner has, optionally, a coagulant solution applied thereto. At step 110, the liner is coated with a polymeric composition containing a blend of carboxylated acrylonitrile butadiene copolymer and polychloroprene copolymer, as described above, such as a 70/30 blend. Embodiments of the invention include wherein the knitted liner is sprayed with the polymeric composition or dipped into the polymeric composition to cover at least a portion of the liner and form a coating. For example, the knitted liner is optionally dip coated for a knuckle-dip, palm-dip, three-quarters dip, or a full-dip. At step 112, a decision is made whether to add a second layer of the polymeric composition. If the answer is yes, the method 100 returns to step 110. Alternatively, the knitted liner having the coating disposed thereon is optionally sprayed or dipped into the coagulant solution again at step 108 and then proceeds to step 110 for an additional coating of the polymeric composition. Those skilled in the art may utilize other chemical compositions for the rubber polymer and utilize various other dipping techniques, without limiting and departing from the scope of the invention. If no second coating is to be added, the method 100 proceeds to step 114.

At step 114, the coating(s) is allowed to gel. The method 100 then proceeds to step 116, at which point the coating(s) is cured. In at least one embodiment according to the invention, the gloves are cured (e.g., tumble dried) in, for example, a dryer at 150-180° F. for 15-20 minutes. The curing process reduces the tackiness of the rubber coating and ensures that the gloves will not stick to one another during the drying process. In other embodiments of the invention, the gloves are optionally allowed to dry in ambient air. At step 118, the method 100 ends. It should be noted that some of the steps of method 100 may be performed in a different order or omitted. For example, to form an unsupported glove, i.e., a glove having no knitted liner, at step 104, a hand-shaped former is optionally provided (having no liner dressed thereon) and the method 100 proceeds as described above. Also, the polymeric composition disposed at step 110 may be foamed with an open cell structure, a closed cell structure, or comprise an unfoamed layer. Furthermore, if any additional polymeric composition is disposed onto a first layer of polymeric composition, this additional layer is optionally foamed with an open cell structure, a closed cell structure, or comprises an unfoamed layer. Moreover, if the liner is previously formed, it may have a coagulant disposed thereon before being dressed on a former.

Figure 2:
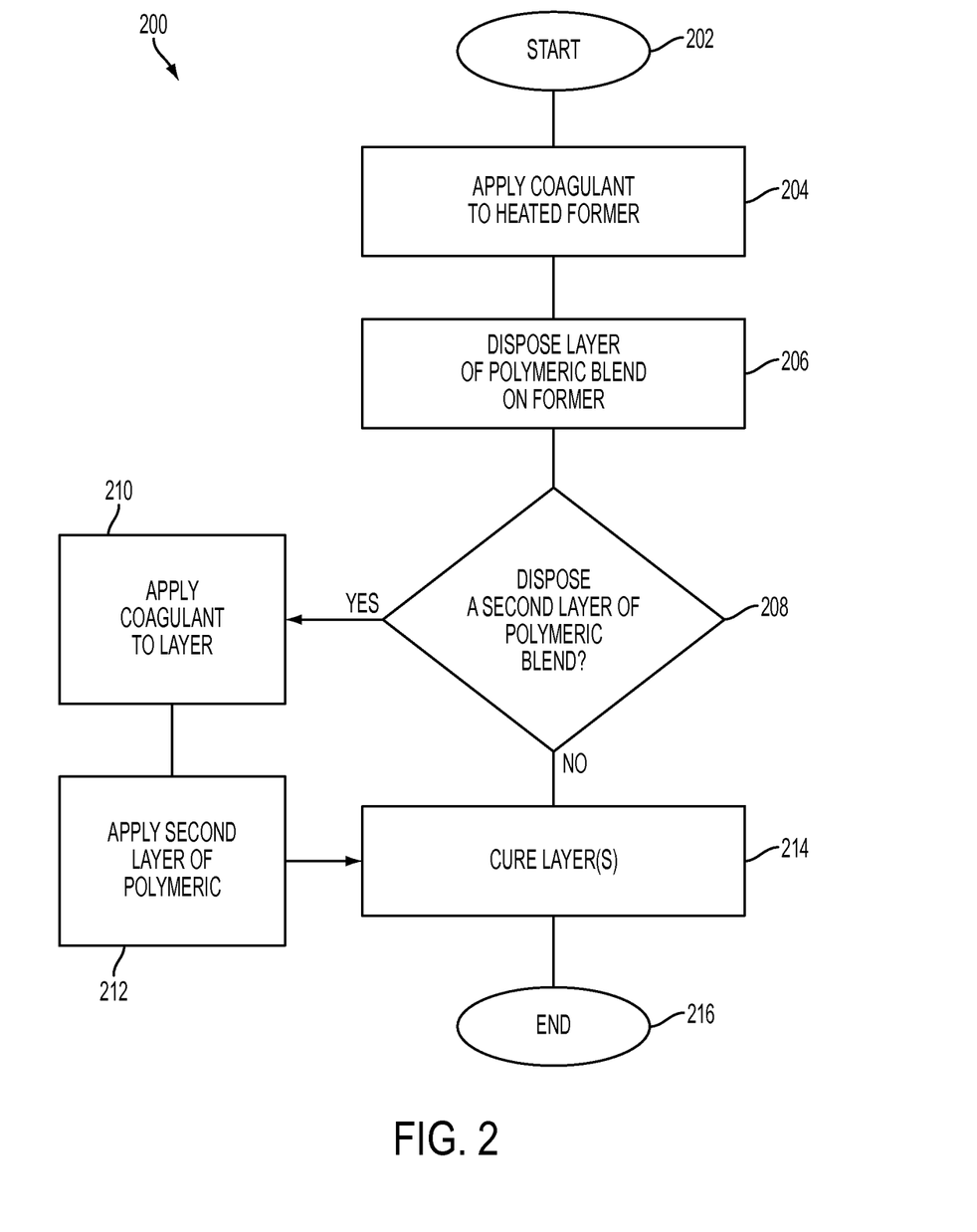
FIG. 2 depicts an exemplary flow diagram of a method for making an unsupported glove according to embodiments of the present invention.

FIG. 2 depicts an exemplary flow diagram of a method 200 for making an unsupported glove according to embodiments of the present invention. In at least one exemplary embodiment, a method 200 starts at step 202 and proceeds to step 204, at which point a coagulant is applied to an optionally heated former. At step 206, a layer of polymeric composition, comprising a blend of NBR and polychloroprene, as discussed herein, is disposed on the former by dipping the former into a bath. At step 208, a decision is made whether to apply a second layer of the blend onto the first layer. If the answer is yes, a coagulant is applied to the layer of polymeric composition disposed on the former at step 210 and a second layer of polymeric composition (which may be the same as or different than the layer disposed at step 206) is disposed thereon at step 212. If the answer is no, the method 200 proceeds directly to step 214, at which point the layer or layers of polymeric composition are cured. The method 200 then proceeds to step 216, at which point the method 200 ends.

Figure 3:
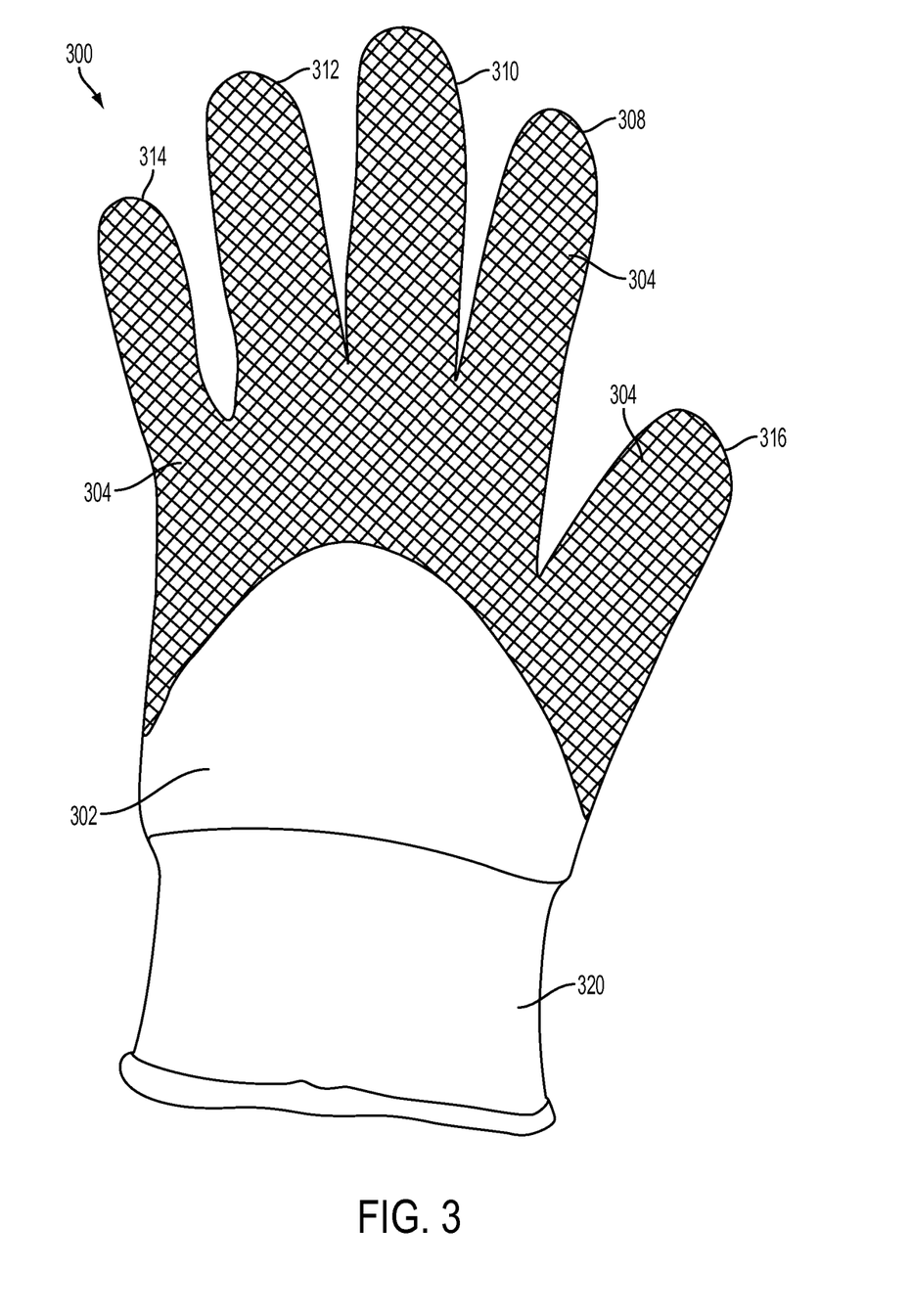
FIG. 3 depicts a backhand of a left-handed glove having a knitted liner and a coating disposed on the knitted liner, according to embodiments of the present invention.

FIG. 3 depicts a backhand of a left-handed glove 300 having a knitted liner 302 and a coating 304 disposed on the knitted liner, according to embodiments of the present invention. The knitted liner 302 can be comprise several sections, including sections for each of the finger components 308, 310, 312, 314, and the thumb 316, and, optionally, a wrist section 320. Coating 304 is disposed on liner 302 in a three-quarters-dip, although, as discussed above, the coating 304 may be a palm dip or full dip.

Technologies for knitting each section for each of the components can be knit on a knitting machine, such as manufactured by Shima Seiki, Mfg, Inc., and requires programming of the machine for each of the different sections. The knitted liner 202 may be configured in a manner described in commonly assigned U.S. Patent Application Publication Number 2009/0211305, incorporated herein by reference in its entirety.

Knitted liners in accordance with embodiments of the invention comprise many different yarns and filaments to impart a variety of different properties to the liners made therefrom. For example, cotton, wool, rayon, steel wire, glass fibers, filaments, ultra-high molecular weight polyethylene (UHMWPE), such as high-performance polyethylene (HPPE), DYNEEMA®, SPECTRA®, and the like; nylon 6, nylon 66, modacrylic yarns, oxidized-polyacrylonitrile (OPAN), meta-aramids, such as NOMEX®, para-aramids, such as KEVLAR®, TWARON®, aromatic polyester, such as VECTRAN®, and the like, or any blend of these fibers and materials. Any yarn may comprise a blend of yarns, such as can be created by ring spun, rotor spun, friction spun, braiding, and other processes for blending yarns. Furthermore, fabric liners comprise, for example, a composite yarn including at least one core yarn and at least one wrapping yarn as disclosed in commonly-assigned U.S. Pat. No. 8,074,436, which is herein incorporated by reference in its entirety. At least one exemplary blended yarn according to the invention comprises a cut-resistant composite yarn comprising 90% HPPE and 10% glass fiber, which is gel, wet, or dry spun into a core yarn and is subsequently wrapped with, for example, 2X-50 denier polyamide wrapping yarns (such as nylon 66). Similarly, a blended yarn according to the invention comprises a composite yarn that includes, for example, a 160 denier filament of 90% HPPE and 10% glass fibers that are gel, wet, or dry spun to form a core yarn and wrapped with a 2X-50 denier polyamide wrapping yarn, resulting in a 289 dtex composite yarn.

Some yarns may be used for cut-resistance, such as steel wire, glass fibers, filaments, ultra-high molecular weight polyethylene, NOMEX®, TWARON®, KEVLAR®, and DYNEEMA®. Other yarns provide dexterity and fit properties, such as stretchable yarns, for example, stretchable polyurethane-polyurea copolymers, such as SPANDEX® and LYCRA®. Yarns capable of moisture management, such as STA-COOL® polyesters, HYDROTEC® polyesters, AQUARIUS® nylons, and mixes of fibers, such as DRY-ENERGY®, may be included to withdraw moisture and perspiration from the skin, which also provide comfort.

Knitted liners in accordance with embodiments of the invention comprise many different yarns and filaments to impart a variety of different properties to the liners made therefrom. For example, cotton, wool, rayon, steel wire, glass fibers, filaments, ultra-high molecular weight polyethylene (UHMWPE), high-performance polyethylene (HPPE), DYNEEMA®, SPECTRA®, nylons, modacrylic yarns, oxidized-polyacrylonitrile (OPAN), meta-aramids, such as NOMEX®, para-aramids, such as KEVLAR®, TWARON®, VECTRAN®, and the like, or any blend of these fibers and materials. Any yarn may comprise a blend of yarns, such as can be created by ring spun, rotor spun, friction spun, braiding, and other processes for blending yarns.

Some yarns may be used for cut-resistance, such as steel wire, glass fibers, filaments, ultra-high molecular weight polyethylene, NOMEX®, TWARON®, KEVLAR®, and DYNEEMA®. Other yarns provide dexterity and fit properties, such as stretchable yarns, for example, SPANDEX® and LYCRA®. Yarns capable of moisture management, such as STA-COOL® polyesters, HYDROTEC®, AQUARIUS®, and DRYENERGY®, may be included to withdraw moisture and perspiration from the skin, which also provide comfort.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification do not necessarily refer to the same embodiment of the invention. Also, as used throughout this application, the word "may" is used in a permissive sense (i.e., meaning having the potential to), rather than the mandatory sense (i.e., meaning must). Similarly, the words "include," "including," and "includes" mean including but not limited to, i.e., open-ended. Furthermore, the particular features, structures, materials, or characteristics may be combined in any suitable manner in any one or more of the embodiments.

Also, reference may be made to a glove, a liner, a glove liner, and the like. A coated glove comprises a liner and a polymeric coating adhered thereto and may be referred to as a supported glove. Furthermore, a liner having no coating may be referred to as a glove. The terms latex, polymeric, and elastomeric may be used interchangeably herein. It is to be noted that any knitted liner, any coagulant, any rheology modifier, and polymeric composition described herein, according to embodiments of the invention, may be combined in any combination.

Also, the use of the terms "a" and "an" and "the" and other referential adjectives describing embodiments of the invention are to be construed both in the singular and plural unless otherwise indicated or clearly contradicted by context. Ranges of values herein are merely intended to serve as a shorthand method of referring to each separate value falling within the range; unless otherwise indicated herein, and each range value is incorporated into the specification as if individually recited herein. All methods described herein can be performed in any suitable order unless otherwise indicated herein or clearly contradicted by context. The use of any and all examples, or exemplary language (e.g., "such as") provided herein, is intended merely to better illustrate the invention and does not pose a limitation on the scope of the invention unless otherwise claimed. No language in the specification should be contemplated as indicating any non-claimed element as essential to the practice of the invention.

While the foregoing is directed to embodiments of the present invention, other and further embodiments of the invention may be devised without departing from the basic scope thereof, and the scope thereof is determined by the claims that follow.

What is claimed is:

1. A polymer composition comprising a blend of approximately 80 to approximately 70 parts per hundred rubber (phr) acrylonitrile butadiene copolymer and approximately 20 to approximately 30 phr polychloroprene copolymer, wherein the polymer composition comprises:
    anti-flocculant in an amount of 0.2 phr to 1.0 phr;
    sulfur in an amount of 0.5 to 3.0 phr;
    activator in an amount of 2.0 to 2.7 phr; and
    accelerator in an amount of 0.5 to 1.0 phr.

2. The polymer composition of claim 1, wherein the acrylonitrile butadiene copolymer comprises acrylonitrile in an amount of between 35% to 40% by weight.

3. The polymer composition of claim 1, wherein the polychloroprene copolymer comprises chloroprene and sulfur.

4. The polymer composition of claim 1, wherein the amount of acrylonitrile butadiene copolymer is approximately 70 phr, and the amount of chloroprene copolymer is approximately 30 phr.

5. The polymer composition of claim 1, further comprising at least one of a thixotropic agent, a vulcanizing agent, surfactant, or a pigment.

6. The polymer composition of claim 1, wherein a pH of the composition ranges from approximately 9.5 to 10.0 before addition of a pH adjustment.

7. The polymer composition of claim 1, further comprising potassium hydroxide.

8. The polymer composition of claim 1, further comprising potassium hydroxide in an amount of 0.1 to 1.0 phr.

9. The polymer composition of claim 1, wherein the anti-flocculant is present in an amount of 0.2 phr.

10. The polymer composition of claim 1, wherein the accelerator is present in an amount of 0.5 phr.

11. The polymer composition of claim 1, wherein the activator is zinc oxide (ZnO).

12. A glove, comprising:
    a knitted liner; and
    a coating disposed on the knitted liner comprising an elastomeric component having 80 to 70 parts per hundred rubber (phr) acrylonitrile butadiene copolymer, and from 20 to 30 phr polychloroprene copolymer, wherein the coating further comprises:
    activator in an amount of 2.0 to 2.7 phr;
    sulfur in an amount of 0.5 to 3.0 phr; and
    accelerator in an amount of 0.5 to 1.0 phr, wherein the coating is substantially-free of anti-flocculant, and wherein the glove has an ANSI abrasion level of 4.

13. The glove of claim 12, wherein the elastomeric component further comprises potassium hydroxide in an amount of 0.1 to 1.0 phr.

14. The glove of claim 12, wherein the anti-flocculant is present in an amount of 0.2 phr.

15. The glove of claim 12, wherein the sulfur is present in an amount of 0.5 phr.

16. The glove of claim 12, wherein the activator is zinc oxide (ZnO).

17. The glove of claim 12, wherein the accelerator is ZDBC present in an amount of 0.5 to 1.0 phr.

18. The glove of claim 12, wherein the coating is cured.

19. A glove, comprising:
    a knitted liner; and
    a coating disposed on the knitted liner comprising an elastomeric component having 80 to 70 parts per hundred rubber (phr) acrylonitrile butadiene copolymer, and from 20 to 30 phr polychloroprene copolymer, wherein the polychloroprene copolymer comprises chloroprene and sulfur, and wherein the coating further comprises:
    0.2 phr to less than 1.0 phr anti-flocculant;
    activator in an amount of 2.0 to 2.7 phr;
    potassium hydroxide in an amount of 0.1 to 1.0 phr;
    between 0.5 to 3.0 phr sulfur; and
    between 0.5 to 1.0 phr accelerator, wherein the glove has an ANSI abrasion level of 4.

20. The glove of claim 19, wherein the coating is cured.

* * * * *